United States Patent
Crespin et al.

(10) Patent No.: US 10,016,822 B2
(45) Date of Patent: Jul. 10, 2018

(54) TANGENTIAL CUTTING INSERT AND MILLING TOOL COMPRISING SUCH A CUTTING INSERT

(71) Applicant: SANDVIK INTELECTUAL PROPERTY AB, Sandviken (SE)

(72) Inventors: Frank Crespin, Parcay-Meslay (FR); Patrick Huteau, Saint Cyr sur Loire (FR)

(73) Assignee: SANDVIK INTELLECTUAL PROPERTY AB, Sandviken (SE)

(*) Notice: Subject to any disclaimer, the term of this patent is extended or adjusted under 35 U.S.C. 154(b) by 0 days.

(21) Appl. No.: 15/518,519

(22) PCT Filed: Sep. 24, 2015

(86) PCT No.: PCT/EP2015/071968
§ 371 (c)(1),
(2) Date: Apr. 12, 2017

(87) PCT Pub. No.: WO2016/058803
PCT Pub. Date: Apr. 21, 2016

(65) Prior Publication Data
US 2017/0225244 A1 Aug. 10, 2017

(30) Foreign Application Priority Data

Oct. 13, 2014 (EP) .................................... 14188663

(51) Int. Cl.
*B23C 5/20* (2006.01)
*B23C 5/06* (2006.01)
*B23C 5/10* (2006.01)

(52) U.S. Cl.
CPC .................. *B23C 5/20* (2013.01); *B23C 5/06* (2013.01); *B23C 5/109* (2013.01); *B23C 5/202* (2013.01);
(Continued)

(58) Field of Classification Search
CPC .. B23C 5/06; B23C 5/20; B23C 5/207; B23C 5/08; B23C 5/202; B23C 2210/207; B23C 5/109; B23C 2200/0461; B23C 2200/367
See application file for complete search history.

(56) References Cited

U.S. PATENT DOCUMENTS 3,955,259 A * 5/1976 Gustafsson ............. B23C 5/207
407/113
4,681,488 A * 7/1987 Markusson ............. B23C 5/202
407/113

(Continued)

FOREIGN PATENT DOCUMENTS

DE 102012108751 A1 * 3/2014 ............. B23C 5/109
EP 0769341 A1 4/1997

*Primary Examiner* — Sara Addisu
(74) *Attorney, Agent, or Firm* — Corinne R. Gorski

(57) ABSTRACT

A tangential cutting insert for a milling tool includes a cutting face that extends along a longitudinal axis and along a transversal axis, and a cutting edge that extends at the periphery of the cutting face. The cutting face has a central portion including first and second central cutting edges extending along the longitudinal axis and on opposite sides of the cutting face, and an outwardly extending end portion having at least three end cutting edges. A first of the at least two cutting edges is inclined relative to the longitudinal axis and a second of the at least two end cutting edges is inclined relative to the transversal axis at an angle from 10° to 35° respectively, for example, 20° to 30° or 25°.

18 Claims, 3 Drawing Sheets

(52) U.S. Cl.
CPC ........ *B23C 5/207* (2013.01); *B23C 2200/367* (2013.01)

(56) References Cited

U.S. PATENT DOCUMENTS

| | | | | |
|---|---|---|---|---|
| 5,020,944 | A | | 6/1991 | Pawlik |
| 5,190,418 | A | * | 3/1993 | Nakayama ............... B23C 5/207 407/113 |
| 5,314,269 | A | * | 5/1994 | Arai ...................... B23C 5/2221 407/113 |
| 6,039,515 | A | * | 3/2000 | Lamberg ............... B23B 27/141 407/113 |
| 6,257,807 | B1 | * | 7/2001 | Heinloth ............... B23B 51/048 407/113 |
| 6,527,486 | B2 | * | 3/2003 | Wiman ................. B23B 27/141 407/113 |
| 6,929,432 | B2 | * | 8/2005 | Roman ................. B23B 27/145 407/113 |
| 8,523,498 | B2 | * | 9/2013 | Uno .......................... B23C 5/06 407/113 |
| 8,858,132 | B2 | * | 10/2014 | Heinloth ................... B23C 3/06 407/115 |
| 9,333,567 | B2 | * | 5/2016 | Maeta ..................... B23C 5/207 |
| 2005/0019109 | A1 | | 1/2005 | DeRoche et al. |
| 2007/0034063 | A1 | * | 2/2007 | Wurfels .............. B23B 27/1618 83/74 |
| 2009/0155005 | A1 | * | 6/2009 | Jansson ..................... B23C 5/06 407/114 |
| 2011/0020080 | A1 | * | 1/2011 | Zettler ..................... B23C 5/06 407/113 |
| 2011/0299946 | A1 | * | 12/2011 | Hecht ..................... B23C 5/207 407/42 |
| 2012/0087748 | A1 | * | 4/2012 | Uno ........................... B23C 5/06 407/42 |

* cited by examiner

TANGENTIAL CUTTING INSERT AND MILLING TOOL COMPRISING SUCH A CUTTING INSERT

RELATED APPLICATION DATA

This application is a § 371 National Stage Application of PCT International Application No. PCT/EP2015/071968 filed Sep. 24, 2015 claiming priority of EP Application No. 14188663.0, filed Oct. 13, 2014.

FIELD OF THE INVENTION

The invention relates to a tangential cutting insert for a milling tool. The invention further relates to a milling tool comprising such a tangential cutting insert.

BACKGROUND OF THE INVENTION

It is known in the field of machining to use tangential cutting inserts, i.e. cutting inserts having a cutting face and a flank face disposed transversally to the cutting face, where a hole for clamping the cutting insert to a machining tool is arranged through the flank face. A known advantage of such a tangential cutting insert is that the width of the cutting face may be reduced without reducing the length of the cutting insert so that the bulkiness of the cutting face may be also reduced—especially when mounted onto a rotating machining tool, for instance a milling tool. In this way, since the bulkiness of the cutting face is reduced, it enables to design rotating machining tool having reduced diameter. Another advantage is that the tangential cutting insert is oriented in such a manner that during a cutting operation on a workpiece the cutting forces are directed along a major (thicker) dimension of the cutting insert, whereby the cutting insert can withstand greater cutting forces than when oriented in such a manner that the cutting forces are directed along a minor (thinner) dimension of the cutting insert.

EP-A-0 769 341 discloses a milling tool comprising tangential cutting inserts vertically and horizontally arranged onto the milling tool for machining a work piece transversally and along a rotating axis of the milling tool. The tangential cutting inserts disclosed in this document comprise a cutting face having a substantially rectangular shape. The cutting face further has quarter-circle-shaped transition cutting edge portions between each straight cutting edge portions of the cutting face. Furthermore, the horizontal and vertical tangential cutting inserts are arranged onto the milling tool such that, if the position of the cutting edge of a horizontal and a vertical cutting inserts relative to the rotating axis of the milling tool are gathered in a same plane, an end portion of each cutting edges are superimposed on each other. In this way, continuity of the machining operation between each successive cutting inserts is preserved.

However, one drawback of this known milling tool (particularly in short-chipping materials such as cast-iron) is that the machined surface generated by the milling tool may be subjected to frittering at locations where the tangential cutting inserts exit the work piece during milling. The milling tool may hereby also exhibit detrimental vibrations during milling. This result in a machined surface with an inappropriate surface finish notably subjected to mechanical behaviour issues, cracking or visual defects.

SUMMARY OF THE INVENTION

The aim of the present invention is to provide a technical solution for a tangential cutting insert able to be used both as a horizontal and a vertical cutting insert onto a milling tool, while being able to generate a machined surface with an improved surface finish, notably at a location where the milling tool exit a work piece.

This object is achieved with a tangential cutting insert for a milling tool, comprising a cutting face extending along a longitudinal axis and along a transversal axis, which is orthogonal to the longitudinal axis, and a cutting edge extending at the periphery of the cutting face, the cutting face comprising:
- a central portion comprising first and second central cutting edges extending along the longitudinal axis and on opposite sides of the cutting face,
- an outwardly extending end portion having at least three end cutting edges, at least two of the end cutting edges being arranged on opposite sides of the longitudinal axis, wherein a first of the at least two cutting edges is inclined relative to the longitudinal axis and a second of the at least two end cutting edges is inclined relative to the transversal axis, at an angle from 10° to 35° respectively, preferably 20° to 30°, more preferably 25°.

According to another embodiment, the outwardly extending end portion comprises a third end cutting edge extending between the first and the second end cutting edges, along the transversal axis.

According to another embodiment, the outwardly extending end portion further comprises a fourth and a fifth end cutting edges arranged on opposite sides of the longitudinal axis, wherein the fourth end cutting edge is inclined relative to the longitudinal axis and the fifth end cutting edge is inclined relative to the transversal axis, at an angle from 10° to 35° respectively, preferably 20° to 30°, more preferably 25°.

According to another embodiment, the second and the fourth end cutting edges are inclined at the same angle relative to the transversal and longitudinal axis respectively.

According to another embodiment, the cutting edge is symmetric relative to the longitudinal axis.

According to another embodiment, the cutting edge is symmetric relative to the transversal axis.

According to another embodiment, the outwardly extending end portion further comprises at least one transition cutting edge extending from one of the end cutting edges, the at least one transition cutting edge being inclined relative to the longitudinal or transversal axis at an angle lower than the angle at which the one of the end cutting edges from which the at least one transition cutting edge extends, preferably at an angle from 5° to 15°, more preferably 11°.

According to another embodiment, the outwardly extending end portion comprises:
- a first transition cutting edge between the first central cutting edge and the fourth end cutting edge, and
- a second transition cutting edge between the second end cutting edge and the third end cutting edge,
- a third transition cutting edge between the second central cutting edge and the first end cutting edge,
- a fourth transition cutting edge between the third end cutting edge and the fifth end cutting edge.

According to another embodiment, the first and the second central cutting edges have a wiper radius.

Another object of the invention relates to a milling tool comprising a plurality of tangential cutting inserts as described above mounted onto the milling tool.

According to another embodiment, the milling tool is a face milling tool having a rotating axis, the plurality of tangential cutting inserts comprising:

a plurality of vertical tangential cutting inserts disposed so that the longitudinal axis of the cutting face of the plurality of vertical tangential cutting inserts extends along the rotating axis, a plurality of horizontal tangential cutting inserts disposed so that the longitudinal axis of the cutting face of the plurality of horizontal tangential cutting inserts extends transversally to the rotating axis.

According to another embodiment, the vertical and horizontal tangential cutting inserts are distributed along the periphery of the milling tool so that a vertical tangential cutting insert is preceded and followed by a horizontal tangential cutting insert.

According to another embodiment, the tangential cutting inserts are unevenly distributed along the periphery of the milling tool to provide a differential pitch.

According to another embodiment, the uneven distribution of the tangential cutting inserts to provide differential pitch is arranged so that successive angles defined between two successive horizontal tangential cutting inserts are different to each other.

According to another embodiment, the horizontal tangential cutting inserts are disposed transversally to the rotating axis at a rough cutting plane, the milling tool comprising at least one finishing horizontal tangential cutting insert disposed transversally to the rotating axis at a finishing cutting plane shifted from the rough cutting plane axially outward of the milling tool.

According to another embodiment, the finishing cutting plane is positioned at a distance from 0.02 to 0.06 mm, preferably from 0.03 to 0.05 mm, from the rough cutting plane.

According to another embodiment, the horizontal tangential cutting inserts are positioned at a first predetermined radial position from the rotating axis, the milling tool comprising at least one finishing horizontal tangential cutting insert being positioned at a second predetermined radial position shifted from the first predetermined radial position inwardly of the milling tool.

According to another embodiment, the second predetermined radial position is at a distance from 0.05 to 1.2 mm, preferably 0.1 mm from the first predetermined radial position, inwardly of the milling tool.

Further features and advantages of the invention will appear from the following description of embodiments of the invention, given as non-limiting examples, with reference to the accompanying drawings listed hereunder.

DETAILED DESCRIPTION OF THE INVENTION

Figure 1:
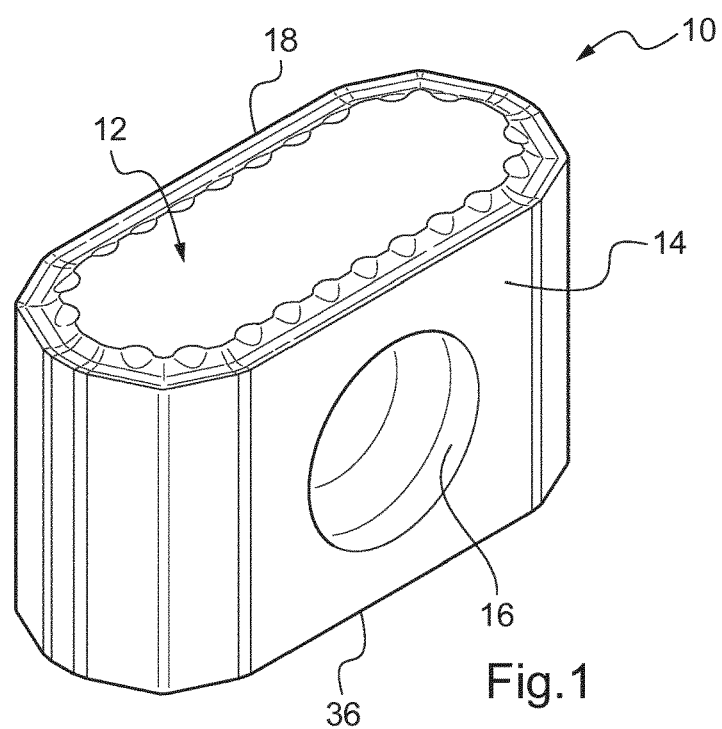
FIG. 1 shows schematically a perspective view of a tangential cutting insert.

According to the invention, a tangential cutting insert for a milling tool comprises a cutting face extending along a longitudinal axis and along a transversal axis orthogonal to the longitudinal axis. The tangential cutting insert further comprises a cutting edge extending at the periphery of the cutting face. The cutting face comprises a central portion comprising first and second central cutting edges extending along the longitudinal axis and on opposite sides of the cutting face. The cutting face further comprises an outwardly extending end portion having at least three end cutting edges, at least two of the end cutting edges being arranged on opposite sides of the longitudinal axis.

Furthermore, a first of the at least two cutting edges is inclined relative to the longitudinal axis and a second of the at least two end cutting edges is inclined relative to the transversal axis, at an angle from 10° to 35° respectively, preferably 20° to 30°, more preferably 25°.

Since the tangential cutting insert comprises a first end cutting edge on one side of the longitudinal axis and a second end cutting edge on the other side of the longitudinal axis that are both inclined at a same angle but relative to different axes (longitudinal and transversal), a same tangential cutting insert is able to be horizontally or vertically mounted onto a milling tool.

Indeed, when gathered in a same plane, a horizontally mounted cutting insert is orthogonal to a vertically mounted cutting insert. Thus, thanks to the arrangement of the cutting edges, the first end cutting edge of a first tangential cutting insert horizontally mounted may overlap the second end cutting edge of a second tangential cutting insert vertically mounted. The first and second end cutting edges may hereby also be of same length, so that the first and second end cutting edges not only overlap in terms of orientation, but also in terms of extension. The inclination of the end cutting edges enables the cutting insert to generate a machined surface with an improved surface finish relative to a tangential cutting edge having end cutting edges inclined at an angle higher than 35° relative to the longitudinal or transversal axis. This results in combining the possibility for the first and second end cutting edges to machine a satisfactory cutting depth while limiting the frittering of the surface generated by the tangential cutting insert, especially at the location where the milling tool exit a work piece.

It has to be noted that the axis relative to which angles are mentioned are the axis which are proper to the intended use (horizontally or vertically mounted) of the end cutting edge. In particular, the first end cutting edge is inclined at a predetermined angle relative to the longitudinal axis because the first end cutting edge is intended to be used with a horizontally mounted tangential cutting insert, i.e. with the longitudinal axis of the cutting face that is transversally disposed relative to a rotating axis of the milling tool. The first end cutting edge is hereby located in proximity to the central cutting edge on the one side of the longitudinal axis, which intended for use on a horizontally mounted insert. The second end cutting edge may on the other hand be located in proximity to the longitudinal axis, yet on the other side of the longitudinal axis which is intended for use on a vertically mounted insert. The term "in proximity" does not mean that the first and second end cutting edges are by necessity located in immediate proximity to the central cutting edge and longitudinal axis respectively. Instead there may for instance be a transition edge and/or further (short) cutting edge portion located in between.

As a consequence, the tangential cutting insert as described above is able to be used both as a horizontal and a vertical cutting insert onto a milling tool, while being able to machine a satisfactory cutting depth and generate a machined surface with an improved surface finish, notably by limiting the frittering of the generated surface at a location where the milling tool exit a work piece. In an embodiment, the outwardly extending end portion comprises a third end cutting edge extending between the first and the second end cutting edges, along (or in parallel with) the transversal axis. The lengths on the first and second end cutting edges may be adapted to overlap in extension. Furthermore, when the outwardly extending end portion is provided so that the first and second end cutting edges fully overlap (i.e. in orientation and extension), the third end cutting edge overlaps a portion of one of the central cutting edges so that the third end cutting edge participates to the machining of the work piece. The third cutting edge also enables the first and second end cutting edges to progressively extend along the outwardly extending end portion and reduces the outward extension of the outwardly extending end portion.

In another embodiment, the outwardly extending end portion further comprises a fourth and a fifth end cutting edges arranged on opposite sides of the longitudinal axis. The fourth end cutting edge is inclined relative to the longitudinal axis and the fifth end cutting edge is inclined relative to the transversal axis, at an angle from 10° to 35° respectively, preferably 20° to 30°, more preferably 25°. This arrangement enables, in addition with the advantages already described above, to use the tangential cutting insert both on a right handed or left handed milling tool. In this embodiment, the second and the fourth end cutting edges may be inclined at the same angle relative to the transversal and longitudinal axis respectively. This enables the second end cutting edge (used for vertical mounting) on a right handed tool to match the inclination of the fourth end cutting edge (used for horizontal mounting) on a left handed tool.

In another embodiment, the cutting edge is symmetric relative to the longitudinal axis. This provides a versatile insert having the same cutting edge design in a right handed and left handed milling tool.

In another embodiment, the cutting face/edge is symmetric relative to the transversal axis. This results in improving the number of indexing, i.e. the lifetime, of the tangential cutting insert. In a same way, for further improving the number of indexing of the tangential cutting insert, the tangential cutting insert may further include another identical cutting face and cutting edge disposed at an opposite side of the tangential cutting insert relative to the cutting face described above.

In another embodiment, the outwardly extending end portion further comprises at least one transition cutting edge extending from one of the end cutting edges. The at least one transition cutting edge is inclined relative to the longitudinal or transversal axis at an angle lower than the angle at which the one of the end cutting edges from which the at least one transition cutting edge extends. A transition cutting edge may differentiate from an end cutting edge in that the length of the transition cutting edge is less than the length of the end cutting edge from which the transition cutting edge extends. Particularly, the ratio between the length of the transition cutting edge and the length of an end cutting edge may be comprised between 1/2 and 1/15, preferably between 1/4 and 1/12, more preferably at 1/10. A ratio of 1/10 means that for a transition cutting edge of 1 mm long, the length of the straight end cutting edge is 10 mm.

This transition cutting edge enables the cutting edge to progressively extend between two successive portions of the cutting edge. The combination of the inclined end cutting edges at a predetermined angle with a transition cutting edge having a lower inclination angle enables to further limit the frittering of the generated surface while ensuring a satisfactory cutting depth. For further limiting the frittering, the transition cutting edge may be inclined at an angle from 5° to 15°, preferably 11°.

According to the invention a milling tool is also provided comprising a plurality of the above mentioned tangential cutting inserts mounted onto the milling tool. In particular a face milling tool comprising a plurality of vertical tangential cutting inserts disposed so that the longitudinal axis of the cutting face of the vertical tangential cutting inserts extends along the rotating axis, and a plurality of horizontal tangential cutting inserts disposed to that the longitudinal axis of the cutting face of the horizontal tangential cutting inserts extends transversally to the rotating axis.

The tangential cutting inserts may be unevenly distributed along the periphery of the milling tool to provide a differential pitch so as to reduce the vibrations of the work piece when milling with the milling tool. An unevenly distribution here means that the angles between successive tangential cutting inserts are not equal, for instance, angles defined between two successive horizontal tangential cutting inserts may be different to each other. Indeed, a differential pitch milling tool is less subjected to vibrations when milling compared to a milling tool having an even pitch or equal distribution of the cutting inserts.

For enabling the milling tool to machine passes having different depths so as to perform rough and finishing operations with a same milling tool, the horizontal tangential cutting inserts may be disposed transversally to the rotating axis at a rough cutting plane, the milling tool comprising at least one finishing horizontal tangential cutting insert disposed transversally to the rotating axis at a finishing cutting plane shifted from the rough cutting plane axially outward of the milling tool. For instance, the finishing cutting plane may be positioned at a distance from 0.02 to 0.06 mm, preferably from 0.03 to 0.05 mm, from the rough cutting plane.

For improving the wear distribution on the tangential cutting inserts, while enabling the milling tool to perform rough and finishing operations with a same milling tool, the horizontal tangential cutting inserts may also be radially shifted inwardly of the milling tool. Particularly, the horizontal tangential cutting inserts may be positioned at a first predetermined radial position from the rotating axis, the milling tool comprising at least one finishing horizontal tangential cutting insert being positioned at a second predetermined radial position shifted from the first predetermined radial position inwardly of the milling tool. Indeed, shifting the finishing tangential cutting insert inwardly of the milling tool enables reducing the load on the finishing tangential cutting inserts so that the end cutting edge of the finishing tangential cutting insert has less tendency to vibrate and the wear is reduced. For instance; the second predetermined radial position is at a distance from 0.05 to 1.2 mm, preferably 0.1 mm from the first predetermined radial position, inwardly of the milling tool.

Detailed Description of the Drawings

FIG. 1 shows a tangential cutting insert 10 with a cutting face 12 and a flank face 14 disposed transversally to the cutting face 12. The flank face 14 comprises a hole 16 for clamping the tangential cutting insert 10 to a milling tool. The cutting face 12 comprises a cutting edge 18 intended to be in contact with a work piece for performing machining operation.

Figure 2:
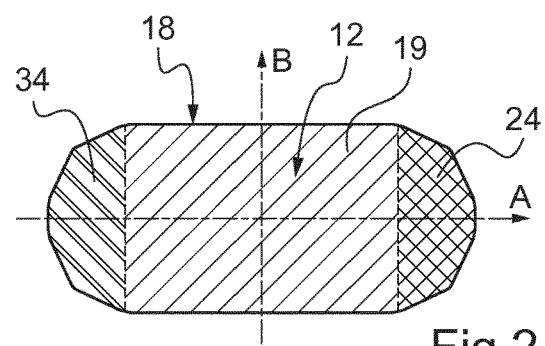
FIGS. 2 and 3 show schematically a top view of the tangential cutting insert of FIG. 1.
Figure 3:
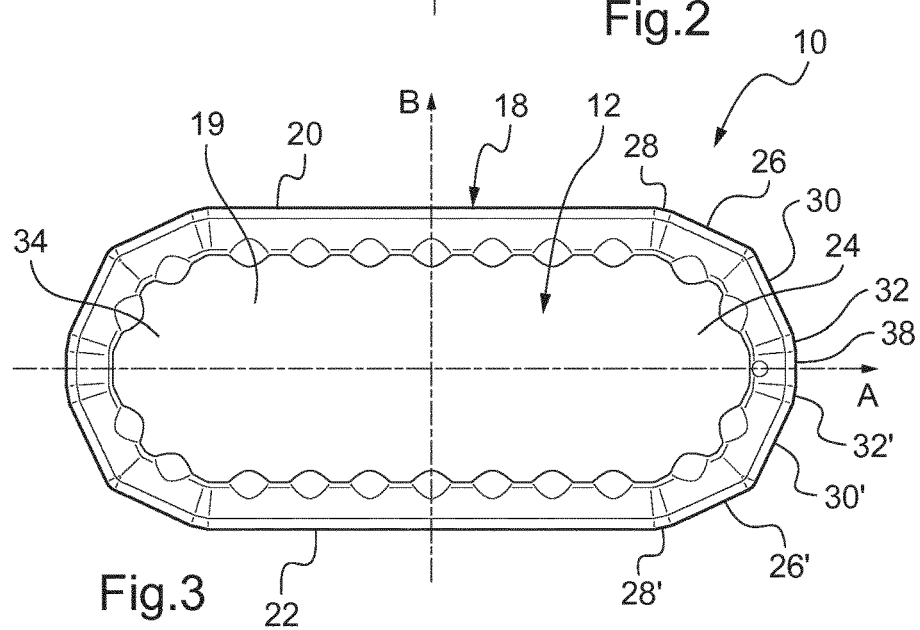

FIGS. 2 and 3 show a top view of the tangential cutting insert 10. The cutting face 12 extends along a longitudinal axis A and further along a transversal axis B, the transversal axis B being orthogonal to the longitudinal axis A. The longitudinal axis A corresponds to a principal extending axis, i.e. the dimension of the cutting face 12 along the longitudinal axis A is longer than the dimension of the cutting face 12 along the transversal axis B. Furthermore, as can be seen the longitudinal axis A and transversal axis B are both located so that each extend along central parts of the cutting face 12. Hence, the longitudinal axis A divides the cutting face 12 into two equal longitudinal halves, whereas the transversal axis B divides the cutting face 12 into two equal transversal halves. In other words, the origin of the longitudinal and transversal axis (i.e. point where axes A and B cross) is located at a geometric centre of the cutting face 12.

In sake of clarity of the present description, the cutting face 12 is divided into a central portion 19, a first outwardly extending end portion 24 and a second outwardly extending end portion 34. The expression "outwardly extending" here refers to the extending direction of the end portions 24 and 34 relative to the central portion 19. In other words, the first and second outwardly extending end portions 24 and 34 extend outwardly in the direction of the longitudinal axis A. The outwardly extending end portions could also be described as convex portions as seen in the longitudinal direction, yet having a chamfered borderline (formed by cutting edges) instead of a smoothly curved or outwardly rounded borderline/cutting edge. Although the central portion 19 and the first and second outwardly extending end portions 24 and 34 cover different portions of the cutting face 12, these portions also refer to the cutting edge 18.

The cutting edge 18 comprises a first 20 and a second 22 central cutting edges both extending along (or in parallel with) the longitudinal axis A, on opposite sides of the central portion 19. The first 20 and the second 22 central cutting edges may have a wiper radius. The outwardly extending end portion is extending along the transversal axis B between the first 20 and the second 22 central cutting edges of the central portion. The first outwardly extending end portion 24 comprises a first 26', a second 30, a third 38, a fourth 26 and a fifth 30' end cutting edges. The end cutting edges 26, 26', 30, 30' and 38 are inclined relative to the longitudinal and/or transversal axis to form a convex chamfered borderline of the outwardly extending end portion 24. In particular, the end cutting edges 26, 26', 30, 30' and 38 are extending in such a way between the first 20 and second 22 central cutting edges. The first and fourth end cutting edge 26' and 26 are inclined relative to the longitudinal axis A at an angle of 25°. However, this angle may be selected from 10° to 35°, preferably 20° to 30°. In a similar way, the second and fifth end cutting edge 30 and 30' are inclined relative to the transversal axis B at an angle of 25°. However, this angle may be selected from 10° to 35°, preferably 20° to 30°. The third end cutting edge 38 extends along (or in parallel with) the transversal axis B.

The first outwardly extending end portion 24 is symmetric relative to the longitudinal axis A such that the overlapping of the end cutting edges described above may be well performed with a same cutting insert horizontally and vertically mounted. Particularly, the first end cutting edge 26' of a first tangential cutting insert 10 horizontally mounted is able to overlap the second end cutting edge 30 of a second tangential cutting insert vertically mounted, when the first and the second cutting inserts are gathered in a same plane.

More generally, the cutting face 12 is symmetric relative to the longitudinal axis A and to the transversal axis B so that the number of indexing of the tangential cutting insert 10 is improved as well as the tangential cutting insert 10 may be used both on a right handed or left handed milling tool, as described above. Furthermore, for further improving the number of indexing of the tangential cutting insert 10, another cutting face 36, identical to the cutting face 12, is disposed at an opposite side of the flank face 14 relative to the cutting face 12.

The tangential cutting insert 10 further comprises a first 28, a second 32, a third 28' and a fourth 32' transition cutting edge. The first transition cutting edge 28 extends between the first central cutting edge 20 and the fourth end cutting edge 26. The second transition cutting edge 32 extends between the second end cutting edge 30 and the third end cutting edge 38. The third transition cutting edge 28' extends between the second central cutting edge 22 and the first end cutting edge 26'. The fourth transition cutting edge 32' extends between the third end cutting edge 38 and the fifth end cutting edge 30'. The first 28 and third 28'transition cutting edges are inclined relative to the longitudinal axis A at an angle of 11°. However, this angle may be selected from 5° to 15°. In a similar way, the second 32 and fourth 32' end cutting edges are inclined relative to the transversal axis B at an angle of 11°. However, this angle may be selected from 5° to 15°.

Figure 4:
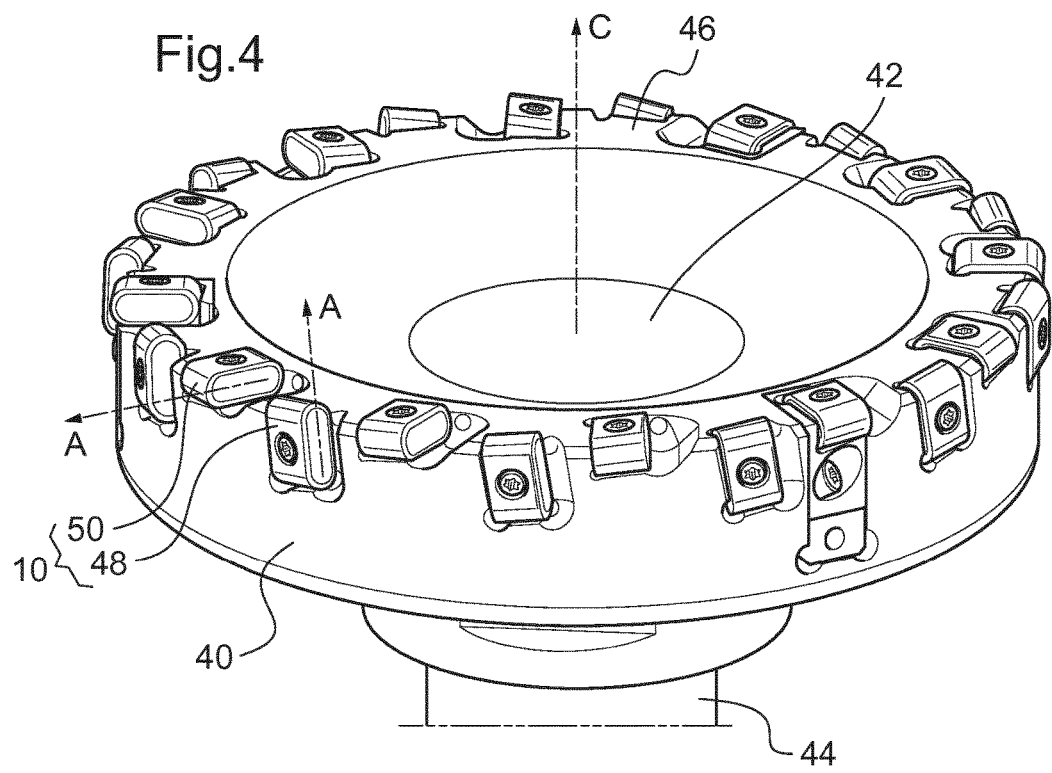
FIG. 4 shows schematically a perspective view of a milling tool comprising the tangential cutting insert of FIGS. 1-3.

FIG. 4 shows a right-hand milling tool 40 comprising a central portion 42 and a securing portion 44 extending from the central portion 42. The securing portion 44 enables the milling tool 40 to be secured to a milling machine (not shown). The milling tool 40 is enabled to be rotated about a rotating axis C for milling operations. The milling tool 40 is of a face milling type having a rotating axis C, wherein the milling tool 40 is circular-shaped in a view along to the rotating axis C.

The milling tool 40 further comprises a peripheral portion 46 extending from the central portion 42 and around the rotating axis C. The milling tool 40 further comprises a plurality of tangential cutting inserts 10 mounted onto the peripheral portion 46. The plurality of tangential cutting inserts 10 comprise a plurality of vertical 48 and horizontal 50 tangential cutting inserts so that the milling tool 40 is enabled to machine transversally and along to the rotating axis C. The milling tool 40 is thus a face mill. The vertical 48 and horizontal 50 tangential cutting inserts are both tangential cutting inserts 10 but arranged vertically and horizontally to the milling tool 40. Particularly, the vertical tangential cutting inserts 48 are disposed so that the longitudinal axis A of their cutting face 12 extends along the rotating axis C. The horizontal tangential cutting inserts 50 are disposed so that the longitudinal axis A of their cutting face 12 extends perpendicularly to the rotating axis C. The vertical 48 and horizontal 50 tangential cutting inserts are distributed along the periphery of the milling tool 40 so that a vertical tangential cutting insert 48 is preceded and followed by a horizontal tangential cutting insert 50 along the periphery of the milling tool 40.

Figure 5:
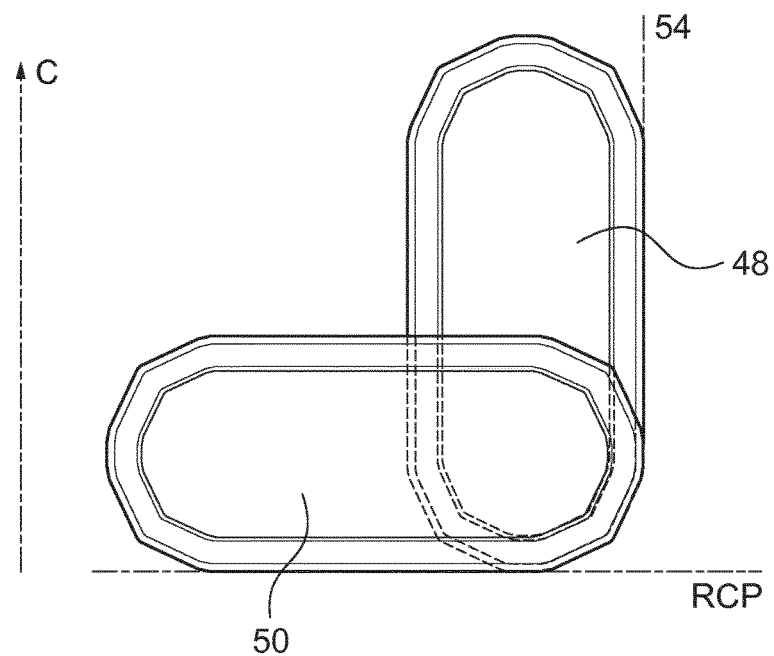
FIG. 5 shows schematically a horizontal and vertical tangential cutting insert of the milling tool of FIG. 4 both represented in a radial plane.

FIG. 5 shows the axial and radial disposition relative to the rotating axis C of the vertical 48 and horizontal 50 tangential cutting inserts both gathered on a plane. In other words, each of the vertical 48 and horizontal 50 tangential cutting inserts are represented in a radial plane. In sake of clarity, the rotating axis C is shown close to the tangential cutting inserts 10 but the direction of the rotating axis C relative to the tangential cutting inserts 10 is preserved. In this radial plane, a portion of the first outwardly extending end portion 24 of both the vertical 48 and horizontal 50 tangential cutting inserts are superimposed on each other so that continuity of the milling operation between each successive cutting inserts is preserved. Further, the horizontal tangential cutting inserts 50 are disposed along the rotating axis C at a rough cutting plane RCP and at a first predetermined radial position 54 transversally to the rotating axis C.

Figure 6:
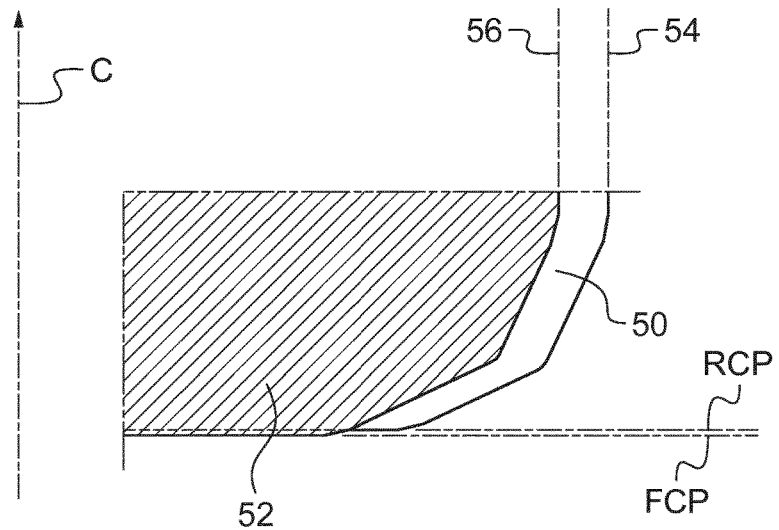
FIG. 6 shows schematically a finishing horizontal tangential cutting insert shifted relative to the horizontal tangential cutting insert of FIG. 5.

As shown on FIG. 6, the milling tool 40 further comprises one or more finishing horizontal tangential cutting inserts 52 disposed along the rotating axis C at a finishing cutting plane FCP arranged at an axial position along the rotating axis C different to the axial position of the rough cutting plane RCP so that the horizontal tangential cutting inserts 50 and 52 are able to machine passes having different depths. This allows the milling tool 40 to perform rough and finishing operations with a same milling tool. Particularly, the finishing cutting plane FCP is shifted axially outward of the milling tool 40 relative to the rough cutting plane RCP. More particularly, the finishing cutting plane FCP is positioned at a distance from 0.02 to 0.06 mm, preferably from 0.03 to 0.05 mm, from the rough cutting plane RCP.

For reducing wearing of the tangential cutting inserts 10, the finishing horizontal tangential cutting insert 52 is also shifted inwardly of the milling tool 40 along a radial direction relative to the rotating axis C. In other words, the horizontal tangential cutting inserts are positioned at a first predetermined distance from the rotating axis C and the finishing horizontal tangential cutting insert 52 are positioned at a second predetermined radial position 56. Particularly, the second predetermined radial position 56 is at a distance from 0.05 to 1.2 mm, preferably 0.1 mm from the first predetermined radial position 54. Shifting the finishing tangential cutting insert 52 inwardly of the milling tool 40 results in reducing the load on the finishing tangential cutting insert 52. In this way, the wiper has less tendency to vibrate and the wear is reduced. The distance between finishing FCP and rough RCP cutting planes is determined with respect to basic knowledge of wipers.

Figure 7:
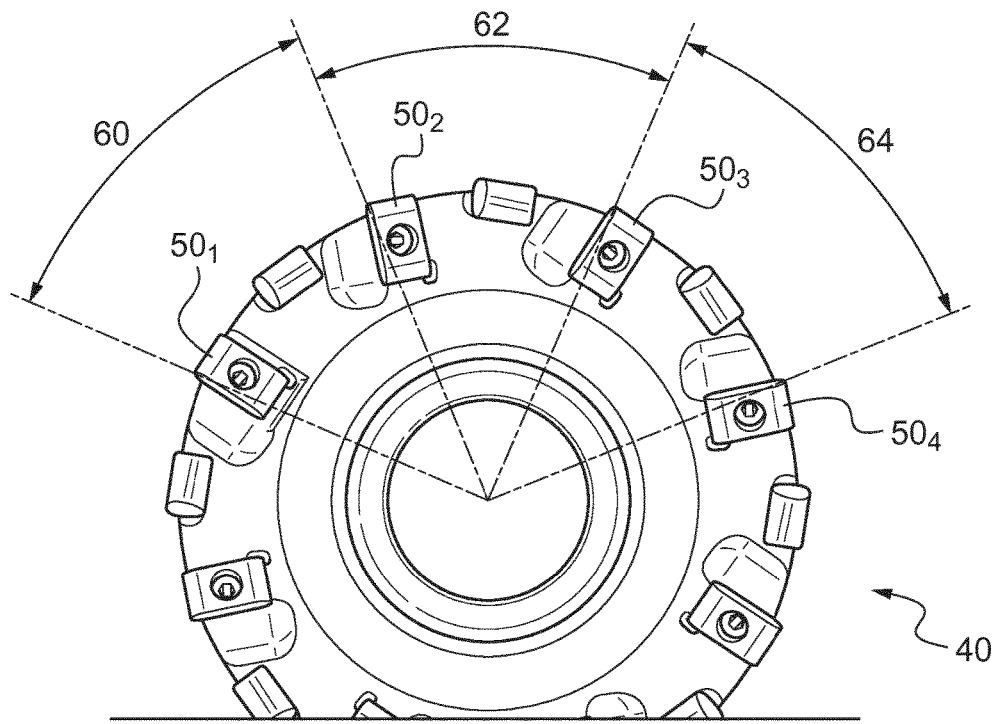
FIG. 7 shows schematically a top view of the milling tool of FIG. 4.

FIG. 7 shows the distribution of the tangential cutting inserts 10 along the periphery of the milling tool 40. As the finishing tangential cutting insert 52 is placed inwardly, the next cutting insert will have more material to machine and it may result in higher cutting edge wear. In order to reduce this phenomenon, the angle between the finishing tangential cutting insert 52 and the preceding cutting insert is decreased. In the same way the angle between the finishing tangential cutting insert 52 and the following cutting insert is decreased. This allows reducing the wear on the tangential cutting insert following the finishing tangential cutting insert 52. This also allows reducing the vibrations of the work piece when milling with the milling tool 40. An unevenly distribution here means that the angles between successive tangential cutting inserts are not equal. Indeed, a differential pitch milling tool is less subjected to vibrations when milling compared to a milling tool having an even pitch or equal distribution of the cutting inserts. The deeper the passes machined by the milling tool 40 are, the more the vibrations are reduced. In this case, the tangential cutting inserts 10 are unevenly distributed so that successive angles defined between two successive horizontal tangential cutting inserts 50 are different to each other. In particular, a first angle 60 defined between a first $50_1$ and a second $50_2$ horizontal tangential cutting inserts, a second angle 62 defined between the second $50_2$ and a third $50_3$ horizontal tangential cutting inserts and a third angle 64 between the third $50_3$ and a fourth $50_4$ horizontal tangential cutting inserts are different to each other. For instance, on a milling tool 40 having a diameter of 125 mm, the first 60, the second 62 and the third 64 angles may be 45°, 44° and 46° respectively.

The invention has been described with reference to preferred embodiments. However, many variations are possible within the scope of the invention.

As an example, the transition cutting edges may be slightly curved. Furthermore, in the embodiment in which the transition cutting edges are straight, a curved connection may be provided at each end of the transition cutting edges.

Moreover, in an alternative way of the distribution of the vertical 48 and horizontal 50 tangential cutting inserts, a vertical tangential cutting insert 48 may be preceded or followed by another vertical tangential cutting insert 48 along the periphery of the milling tool 40. The differential pitch may also be provided by different successive angles between successive vertical inserts, and/or different successive angles between successive horizontal and vertical inserts.

The invention claimed is:

1. A tangential cutting insert for a milling tool, the cutting insert having a cutting face extending along a longitudinal axis and along a transversal axis, which is orthogonal to the longitudinal axis, and a cutting edge extending at the periphery of the cutting face, the cutting face comprising:
   a central portion having first and second central cutting edges extending along the longitudinal axis and on opposite sides of the cutting face; and
   at least one outwardly extending end portion having at least three end cutting edges, at least two of the end cutting edges being arranged on opposite sides of the longitudinal axis, wherein a first of the at least two cutting edges is inclined relative to the longitudinal axis and a second of the at least two end cutting edges is inclined relative to the transversal axis at an angle from 10° to 35° respectively.

2. The tangential cutting insert according to claim 1, wherein the at least one outwardly extending end portion includes a third end cutting edge located between the first and the second end cutting edges, the third end cutting edge extending along the transversal axis.

3. The tangential cutting insert according to claim 2, wherein the at least one outwardly extending end portion includes a fourth and a fifth end cutting edge arranged on opposite sides of the longitudinal axis, wherein the fourth end cutting edge is inclined relative to the longitudinal axis and the fifth end cutting edge is inclined relative to the transversal axis at an angle from 10° to 35° respectively.

4. The tangential cutting insert according to claim 3, wherein the second and the fourth end cutting edges are inclined at a same angle relative to the transversal and longitudinal axis respectively.

5. The tangential cutting insert according to claim 3, wherein the at least one outwardly extending end portion includes at least one transition cutting edge extending from at least one of the end cutting edges, the at least one transition cutting edge being inclined relative to the longitudinal or transversal axis at an angle lower than the angle at which the one of the end cutting edges from which the at least one transition cutting edge extends.

6. The tangential cutting insert according to claim 5, wherein the at least one outwardly extending end portion includes:

a first transition cutting edge between the first central cutting edge and the fourth end cutting edge;

a second transition cutting edge between the second end cutting edge and the third end cutting edge;

a third transition cutting edge between the second central cutting edge and the first end cutting edge; and a fourth transition cutting edge between the third end cutting edge and the fifth end cutting edge.

7. The tangential cutting insert according to claim 1, wherein the cutting edge is symmetric relative to the longitudinal axis.

8. The tangential cutting insert according to claim 1, wherein the cutting edge is symmetric relative to the transversal axis.

9. The tangential cutting insert according to claim 1, wherein the first and the second central cutting edges have a wiper radius.

10. A milling tool comprising:

a plurality of tangential cutting inserts mounted on the milling tool, the cutting insert having a cutting face extending along a longitudinal axis and along a transversal axis, which is orthogonal to the longitudinal axis, and a cutting edge extending at the periphery of the cutting face, the cutting face comprising:

a central portion having first and second central cutting edges extending along the longitudinal axis and on opposite sides of the cutting face; and at least one outwardly extending end portion having at least three end cutting edges, at least two of the end cutting edges being arranged on opposite sides of the longitudinal axis, wherein a first of the at least two cutting edges is inclined relative to the longitudinal axis and a second of the at least two end cutting edges is inclined relative to the transversal axis at an angle from 10° to 35° respectively.

11. The milling tool according to claim 10, wherein the milling tool is a face milling tool having a rotating axis, the plurality of tangential cutting inserts including a plurality of vertical tangential cutting inserts disposed so that the longitudinal axis of the cutting face of the plurality of vertical tangential cutting inserts extends along the rotating axis and a plurality of horizontal tangential cutting inserts disposed so that the longitudinal axis of the cutting face of the plurality of horizontal tangential cutting inserts extends transversally to the rotating axis.

12. The milling tool according to claim 11, wherein the vertical and horizontal tangential cutting inserts are distributed along the periphery of the milling tool so that a vertical tangential cutting insert is preceded and followed by a horizontal tangential cutting insert.

13. The milling tool according to claim 11, wherein the tangential cutting inserts are unevenly distributed along the periphery of the milling tool to provide a differential pitch.

14. The milling tool according to claim 13, wherein the uneven distribution of the tangential cutting inserts that provide the differential pitch is arranged so that successive angles defined between two successive horizontal tangential cutting inserts are different to each other.

15. The milling tool according to claim 11, wherein the horizontal tangential cutting inserts are disposed transversally to the rotating axis at a rough cutting plane, the milling tool including at least one finishing horizontal tangential cutting insert disposed transversally to the rotating axis at a finishing cutting plane shifted from the rough cutting plane axially outward of the milling tool.

16. The milling tool according to claim 15, wherein the finishing cutting plane is positioned at a distance of 0.02 to 0.06 mm from the rough cutting plane.

17. The milling tool according to claim 11, wherein the horizontal tangential cutting inserts are positioned at a first predetermined radial position from the rotating axis, the milling tool including at least one finishing horizontal tangential cutting insert positioned at a second predetermined radial position shifted from the first predetermined radial position inwardly of the milling tool.

18. The milling tool according to claim 17, wherein the second predetermined radial position is at a distance of 0.05 to 1.2 mm from the first predetermined radial position inwardly of the milling tool.

* * * * *